(No Model.)

J. H. OZLEY.
FERTILIZER DISTRIBUTER.

No. 473,952. Patented May 3, 1892.

Witnesses
Jas. K. McCathran
W. T. Duvall

Inventor
John H. Ozley
By his Attorneys,
C. A. Snow & Co.

UNITED STATES PATENT OFFICE.

JOHN HARVEY OZLEY, OF CANE RIDGE, LOUISIANA.

FERTILIZER-DISTRIBUTER.

SPECIFICATION forming part of Letters Patent No. 473,952, dated May 3, 1892.

Application filed January 27, 1892. Serial No. 419,464. (No model.)

*To all whom it may concern:*

Be it known that I, JOHN HARVEY OZLEY, a citizen of the United States, residing at Cane Ridge, in the parish of Union and State of Louisiana, have invented a new and useful Fertilizer-Distributer, of which the following is a specification.

This invention relates to improvements in fertilizer-distributers, the objects in view being to provide a machine into which the fertilizer may be thrown, which machine is so constructed as to serve as an ordinary carrier for the fertilizer, and thus obviate the additional handling, which is customary, first, in bringing the fertilizer to the point of use and then loading the same into the fertilizer-distributer.

A further object of my invention is to utilize in the machine portions of the running-gear of an ordinary farm-wagon, and thus cheapen and simplify by a reduction of the necessary number of parts the fertilizer-distributer.

With these and other objects in view the invention consists in certain features of construction hereinafter specified, and particularly pointed out in the claims.

Figure 1:
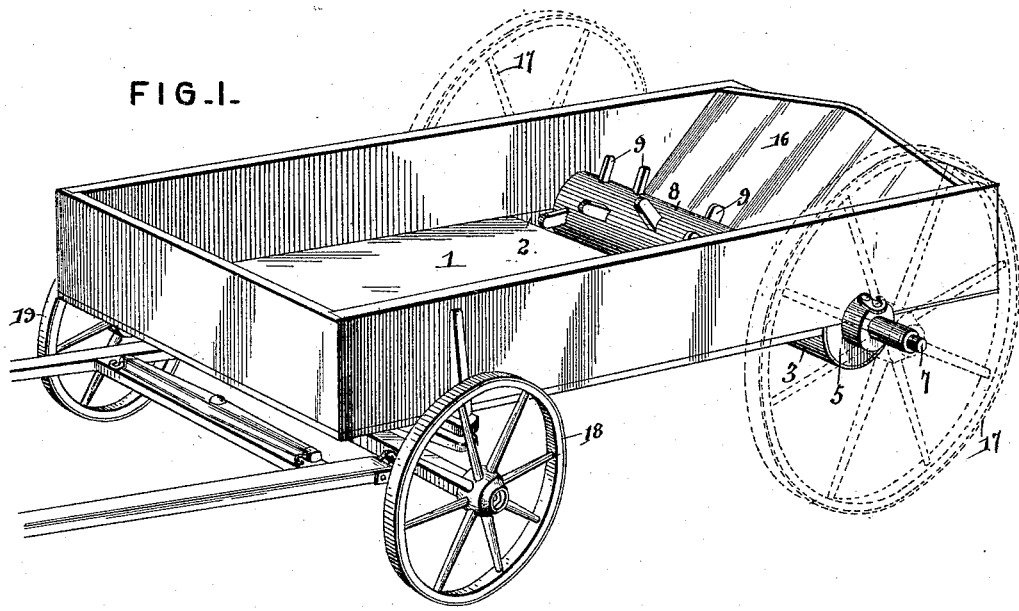
Figure 2:
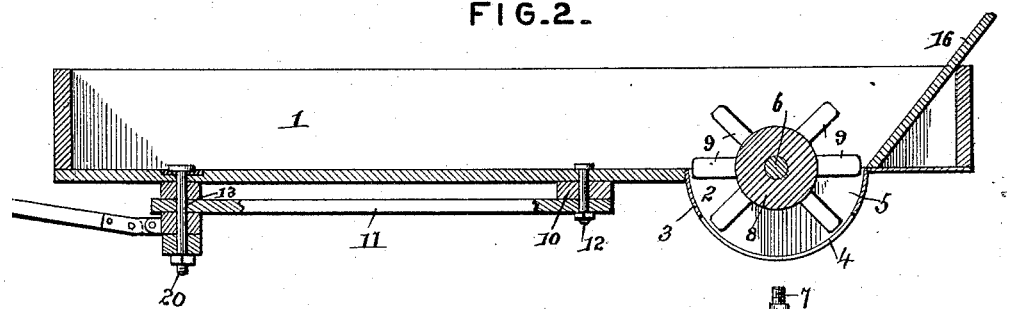
Figure 4:
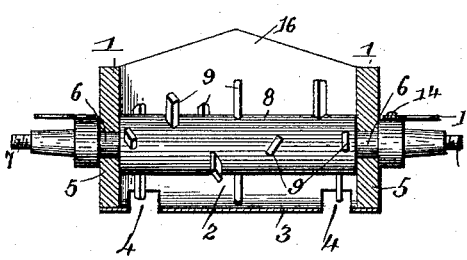
Figure 3:
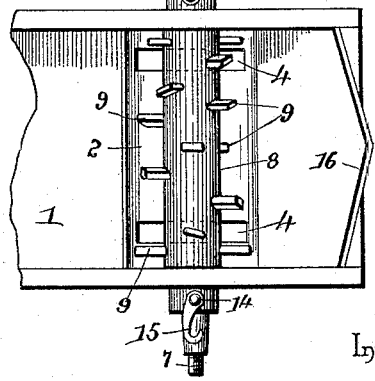

Referring to the drawings, Figure 1 is a perspective of a fertilizer-distributer constructed in accordance with my invention. Fig. 2 is a longitudinal section of the same. Fig. 3 is a plan of the rear portion. Fig. 4 is a transverse section of the hopper in front of the feed or agitator shaft.

Like numerals of reference indicate like parts in all the figures of the drawings.

In practicing my invention I construct a receptacle 1, which receptacle is built like an ordinary wagon-body and is of about the size of the same. The bottom of the receptacle, near its rear end, has an opening 2 transversely cut therein, and this opening has secured under it a semicircular sheet-metal hopper-bottom 3. Semicircular slots 4 are formed in the hopper-bottom near the ends of the same, or the openings may be differently located, as may be desired. In the present instance, however, the distributer is adapted for operation simultaneously upon two rows of plants, and hence I provide an opening for each row. In the ends of the hopper semicircular bearing-boxes 5 are located, and in the bearing-boxes a transverse shaft 6 is mounted for loose rotation. The outer ends of the shaft are provided with axle-spindles 7, the shoulders of which aid in maintaining the shaft in position and against longitudinal movement. A sleeve 8 is fitted upon the shaft between the bearings and within the hopper, and from said sleeve radiates a series of stirrers or feed-spokes 9, arranged spirally, so as to feed the fertilizer from the center of the hopper toward the ends or slots therein. Of course if the slots are differently located the agitator-arms may be otherwise arranged to accommodate themselves to such change in the position of the slots. A cleat 10 is secured transversely to the under side of the receptacle, and a reach-bar 11 has its rear end pivoted by a bolt 12 to the center of the cleat, while its front end is perforated, as at 13, for a purpose hereinafter described. Upon the collars of the spindles, in which the shaft 6 terminates, are pivoted, as at 14, hooks 15. This completes the construction of the fertilizer-distributer, with the exception of an inclined back board 16, located at the rear end of the hopper.

In order to operate my invention, the two hind wheels 17 (shown by dotted lines in Fig. 1) are removed from an ordinary farm-wagon and placed upon the spindles 7 of the shaft 6. The front axle and wheels 18 and 19, respectively, are also removed from the farm-wagon and employed to support the front end of the distributer, and with the king-bolt 20 of said front axle the front end of the reach 11 is loosely connected. As far as described the distributer may be drawn about in the manner of an ordinary farm-wagon and taken to any point to be loaded with fertilizer. The wagon is then driven to the field where the fertilizer is to be distributed and the hooks 15 swung out and into engagement with the spokes of the wheels 17, so that the wheels and shaft 6 become rigidly locked together, and the rotations or revolutions of the wheels are communicated to the shaft 6 and the agitating-arms carried thereby. Thus by driving the wagon over the field the fertilizer is distributed by the openings in the hopper to the two rows of plants. The entire load of fertilizer may be thus continuously distributed, an attendant standing in the receptacle and shoveling or pushing the fertilizer toward the hopper as the contents of the same become exhausted.

From the foregoing description it will be seen that I provide a machine for effectually distributing any of the various kinds of fertilizer, which machine consists of very few parts, is the embodiment of simplicity, and is designed to be employed in connection with the running-gear of an ordinary farm-wagon, with which every farmer is necessarily provided. By the great capacity of the receptacle, as compared with that of the hopper of an ordinary distributer, it will be seen that I effect a great saving in time and labor, in that there is no reloading or transferring from the wagon for hauling the fertilizer to the distributing-machine and that the entire load is continuously fed until exhausted.

In addition to the functions of a fertilizer-distributer, the device may be employed as a planter, it being particularly well adapted for the planting of cotton-seed.

Having described my invention, what I claim is—

1. In a fertilizer-distributer, the combination, with the oblong body constituting a receptacle and provided at its rear end with an opening, and a hopper having feed-openings located under the opening of the receptacle, of a wheel-receiving shaft journaled in bearings formed in the receptacle and over the hopper, provided with agitating-arms, means for locking the wheels removably upon the shaft, and a reach located under the receptacle and adapted to be coupled with the front truck of a wagon, substantially as specified.

2. In a fertilizer-distributer, the combination of a body constituting the receptacle and having its bottom near its rear end provided with a transverse opening, a semicircular hopper having openings secured under the opening of the receptacle, bearing-blocks mounted in the opposite ends of the hopper, a transverse shaft mounted in the bearing-blocks and terminating at its outer end in spindles adapted to receive wheels and between its bearings over the hopper provided with agitating-arms, a pair of hooks pivoted at their inner ends to the spindles and adapted to engage the spokes of said wheels a front wagon-truck for supporting the front end of the receptacle, and a coupling device for connecting the front end of the body with the front truck of a wagon, substantially as specified.

In testimony that I claim the foregoing as my own I have hereto affixed my signature in the presence of two witnesses.

JOHN HARVEY OZLEY.

Witnesses:
R. B. HARRIS,
T. W. SPIGENER.